(12) United States Patent
Mezaael et al.

(10) Patent No.: US 10,638,281 B1
(45) Date of Patent: Apr. 28, 2020

(54) METHOD AND APPARATUS FOR SHARED TELEMATICS SERVICES

(71) Applicant: FORD GLOBAL TECHNOLOGIES, LLC, Dearborn, MI (US)

(72) Inventors: Abraham Mezaael, Southfield, MI (US); Hussam Makkiya, Dearborn, MI (US); Hafiz Shafeek Khafagy, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/288,598

(22) Filed: Feb. 28, 2019

(51) Int. Cl.
| | |
|---|---|
| H04M 11/00 | (2006.01) |
| H04W 4/24 | (2018.01) |
| H04W 4/46 | (2018.01) |
| G07C 5/00 | (2006.01) |
| G06Q 30/02 | (2012.01) |
| G06Q 50/18 | (2012.01) |

(52) U.S. Cl.
CPC .......... *H04W 4/24* (2013.01); *G06Q 30/0283* (2013.01); *G06Q 50/188* (2013.01); *G07C 5/008* (2013.01); *H04W 4/46* (2018.02)

(58) Field of Classification Search
CPC ........ H04W 4/24; H04W 4/46; G06Q 50/188; G06Q 30/0283; G07C 5/008
USPC ......................................................... 455/407
See application file for complete search history.

(56) References Cited

U.S. PATENT DOCUMENTS

| | | | |
|---|---|---|---|
| 9,274,785 B2 | 3/2016 | Jung | |
| 10,341,309 B1* | 7/2019 | Ramirez | ............. H04L 63/0823 |
| 2003/0225668 A1* | 12/2003 | Goto | .................... G06Q 10/047 |
| | | | 705/37 |
| 2017/0032402 A1 | 2/2017 | Patsiokas et al. | |
| 2018/0143995 A1 | 5/2018 | Bailey et al. | |
| 2019/0265045 A1* | 8/2019 | Baik | ..................... G01C 21/28 |

* cited by examiner

*Primary Examiner* — Amancio Gonzalez
(74) *Attorney, Agent, or Firm* — Michael Spenner; Brooks Kushman P.C.

(57) ABSTRACT

Onboard need for data is determined based on a vehicle process requesting data. A request for the data is wirelessly communicated directly to other vehicles in local wireless communication. A price for the data is negotiated, and the data is received, responsive to sending an agreement to pay the negotiated price.

9 Claims, 4 Drawing Sheets

METHOD AND APPARATUS FOR SHARED TELEMATICS SERVICES

TECHNICAL FIELD

The illustrative embodiments generally relate to methods and apparatuses for shared telematics services.

BACKGROUND

Vehicle owners rely on network connectivity for a variety of purposes. As some examples, navigation, application support, media, streaming and on-demand data services are becoming ever more common in vehicles.

Access to data, however, comes at a cost. Displays, modems and data transfer can cause many original equipment manufacturers (OEMs) to eschew data services in lower-end model vehicles. This helps keep an effective and affordable price point for those vehicles. Unfortunately, this also leaves those owners without built-in longer-range data communication services. At the same time, many of those vehicles may still have some form of remote communication capability included therewith, it simply may be insufficient to provide reliable ongoing data transfer, such as a cellular connection, and instead may include shorter range communication useful for localized wireless communication, such as BLUETOOTH.

SUMMARY

In a first illustrative embodiment a system includes a vehicle processor, in a first vehicle, configured to wirelessly communicate a request for the data to a second vehicle in direct wireless communication with the first vehicle, responsive to a vehicle process of the first vehicle requiring an element of data. In this embodiment, the request includes a price for the data determined according to predefined pricing parameters of the first vehicle. The processor is also configured to receive the data from the second vehicle, responsive to agreement by the second vehicle to the price.

In a second illustrative embodiment, a system includes a processor of a first vehicle configured to handle data requests for shared telematics services, configured to receive a data request from a second vehicle in direct wireless communication with the first vehicle. The processor is also configured to utilize predefined pricing parameters to determine a price for providing the data to the second vehicle. The processor is further configured to send the determined price to the second vehicle and, responsive to receiving an acceptance from the second vehicle to pay the determined price, obtain and relay the data to the second vehicle.

In a third illustrative embodiment, a method includes receiving a request for data from a vehicle process executing on a first vehicle. The method also includes determining that a source for the data is a source remote from the first vehicle and that the first vehicle lacks capability to obtain the data. The method further includes communicating wirelessly with a second vehicle to determine a price for obtaining the data from the second vehicle and, responsive to sending an agreement to pay the determined price to the second vehicle, receiving the data from the second vehicle.

DETAILED DESCRIPTION

Figure 1:
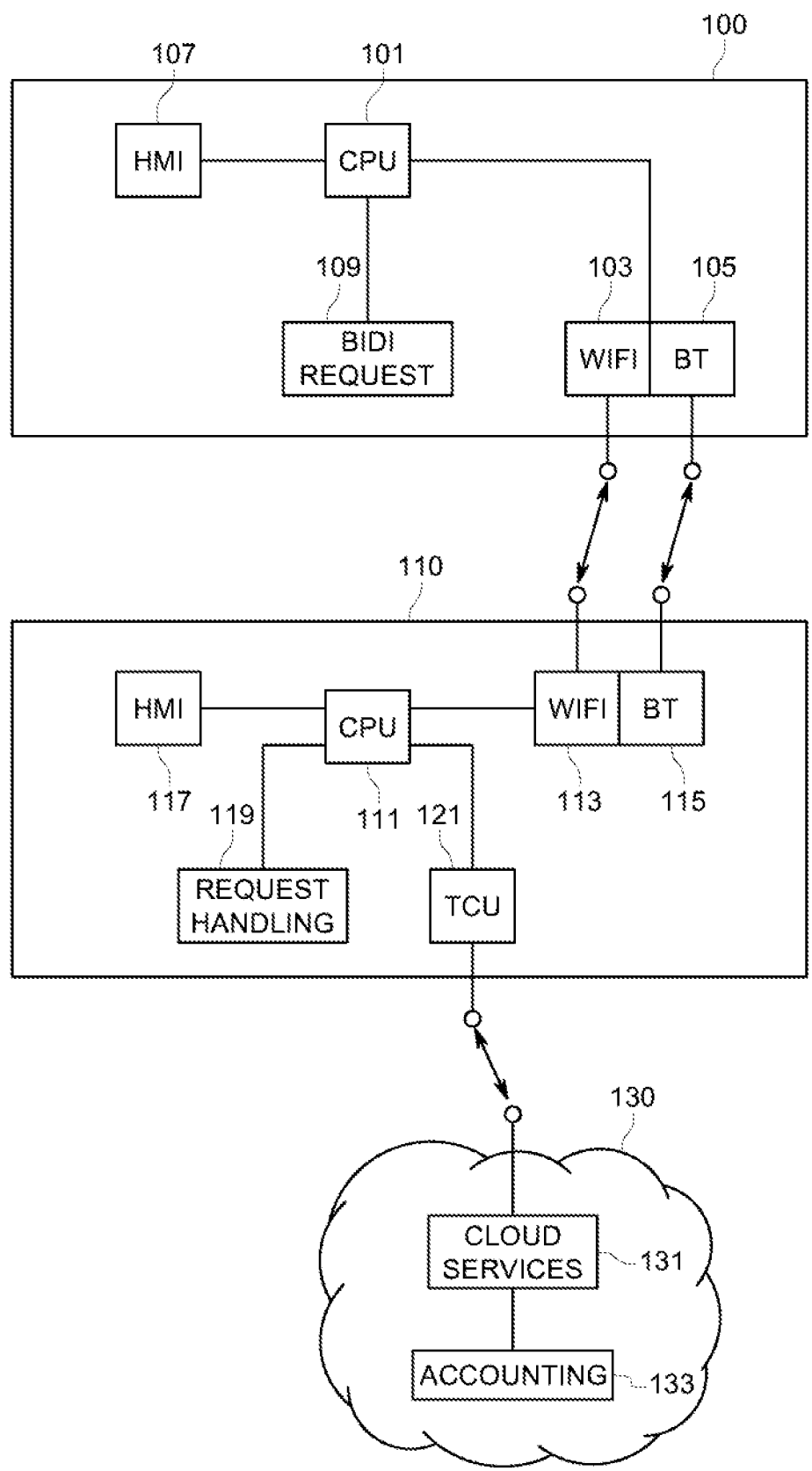
FIG. 1 shows an illustrative data sharing system.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Many vehicles may lack onboard longer-range data support equipment such as a cellular modem supporting telematics data communication services. Nonetheless, those vehicles still may include BLUETOOTH and even Wi-Fi communication systems. Such communication systems can not only communicate with onboard devices and remote access points (e.g., a home router), but may also communicate with other vehicles in a vehicle to vehicle (V2V) communication strategy.

At the same time many other vehicles do have onboard telematics services, creating an opportunity to allow local vehicles lacking cellular communication services to leverage other local vehicles including such communication services. Data requests are often brief in nature, such as a request for a location or request for a small packet of data for application support. Vehicles that lack cellular remote communication services may still provide limited cellular-seeming data services to onboard systems and devices, such as a connected occupant device, by communicating with another local vehicle that includes cellular communication capability and receiving the requested data from the other vehicle that used the cellular communication capability to obtain the data.

At the same time, the drivers of the vehicles having cellular communication services may be willing to sell their data services to other vehicles. Since the vehicle that has cellular communication may often not be using its own connection, that vehicle may be able to service remote requests from other vehicles. While the preceding describes the use of BLUETOOTH or Wi-Fi communication for V2V communication and cellular for long-range communication, it is appreciated that in other instances a vehicle that only includes, for example, BLUETOOTH may request, for example, Wi-Fi services from another vehicle that includes Wi-Fi capability.

By providing data sharing services between vehicles, the illustrative embodiments allow for vehicles lacking cellular telematics to purchase cellular telematics services from other local drivers. Providing automatic servicing conditions (that do not required driver approval each time) for fulfilling certain requests can improve savings and handling times when utilized, and providing bidding options, when appropriate, can allow drivers to compete for service provision or pricing. The uncommon and atypical examples and concepts described herein demonstrate potential improvements achievable through use of those examples, concepts, and the like.

FIG. 1 shows an illustrative system for performing data sharing between vehicles 100, 110. In this illustrative example, computing systems of two vehicles 100, 110 communicate with one other to allow the computing system of the vehicle 110 to provide communication services to the computing system of the vehicle 100.

It should be noted that the vehicle 100 may actually have cellular communications services available via vehicle infrastructure. However, these communications services may be excessively expensive or unavailable for another reason, causing the vehicle 100 to attempt to access the communications services of the vehicle 110 or of another local vehicle 110. For example, if the driver of vehicle 100 is nearing a data cap, and exceeding the cap may cause a $10 charge, the driver may prefer to use a local vehicle 110 service, for example, to service a request and to avoid the risk of going over a cap. The local vehicle 110 service may only cost the driver of vehicle 100 a fraction of the cost incurred if the driver used an onboard cellular service. In this manner, the V2V communication services sharing can also help avoid data overage and be used to service requests between two vehicles that both include cellular communication services.

For illustrative purposes only, the vehicles 100, 110 are shown with a limited component set useful for describing illustrative embodiments. These vehicle system components are not exhaustive, but merely demonstrative of components that may assist in demonstration of illustrative examples.

The vehicle 100 includes a processor 101 connected to a human machine interface (HMI) 103, although this HMI component is not necessary, as data may be requested by vehicles that lack an HMI 103. In instances where the vehicle lacks an HMI 103, the vehicle may use an occupant device (not shown) wirelessly or wiredly connected to the vehicle 100 as an HMI or use audible confirmation for data request handling if confirmation or other occupant interaction is needed.

The vehicle 100 may also include a request/bid handling process 105. This process can request data from other vehicles 110 when appropriate and/or provide pricing comparison and bidding services if those options are enabled. That is, in some embodiments, the vehicle 110 may have a predefined price for data, and any locally available vehicle may service the data requests for the specified price. In those instances, the request process may simply request the data if the specified price is acceptable. In other examples, a plurality of local vehicles 110 may compete for pricing of data services, and in those instances the local onboard request process 105 may assist in determining a winning bidder, to the extent that local vehicles 110 are bidding for providing the cheapest data services. These and other components may be handled by the processor 101 of the vehicle 100.

The processor 101 of the vehicle 100 also handles the operation of various direct communications services. As used herein, direct communications services refers to point-to-point communications between devices without intermediate routers or other devices. As illustrated, such communication services may be provided via as BLUETOOTH 107 and Wi-Fi 109 services. Either of these services and similar V2V communication services may be used to communicate with vehicles 110 for the purpose of request handling.

The vehicle 110 also includes BLUETOOTH 113 and Wi-Fi 115 services, which in this example are in communication (typically via only one of the options) with the vehicle 100. These communication options also connect to other vehicle services through an onboard processor 111. The request handling vehicle 110 may also include an HMI 117, and a process or module for request handling 119. Bidding or pricing of services can be dynamic, and may be addressed live by a vehicle 110 occupant through the HMI 117, or the owner of vehicle 110 may preconfigure pricing for services, which can be automatically handled by the request handling process 119. In some other models, the pricing may be defined by an original equipment manufacturer (OEM) and the drivers may simply be given an opt-in or opt-out option for sharing.

The second vehicle 110 also includes cellular communication services, such as those provided by a telematics control unit (TCU) 121. This controller can include, for example, a vehicle cellular modem and/or other options for longer range communication with the cloud 130.

In an illustrative example, vehicle 100 may require some form of data (weather, traffic, navigation, etc.) and may lack the current capability to obtain such data or may want a cheaper data servicing option than a current onboard option. Accordingly, a request for the required data may be passed to local vehicle 110 via the V2V communication options 107, 109. If the vehicle 110 is capable of servicing the request (e.g., if it includes a communication option capable of communication with an entity designated for providing the requested data), if an owner of vehicle 110 is willing to service the request, and if the pricing for servicing is suitable for the driver of vehicle 100, vehicle 110 may pass the request to the cloud 130, where cloud services 131 can provide the requested data.

Cloud-based accounting services 133 may handle the transaction costs, as the request may include vehicle identifiers identifying vehicle 100 as the payor and vehicle 110 as the payee, usable to charge an owner of vehicle 100 for the transaction and usable to credit the charge to the owner of vehicle 110. In other examples, the vehicles 100, 110 may handle the transaction locally via, for example, onboard wallets capable of exchanging financial and transactional information.

Figure 2:
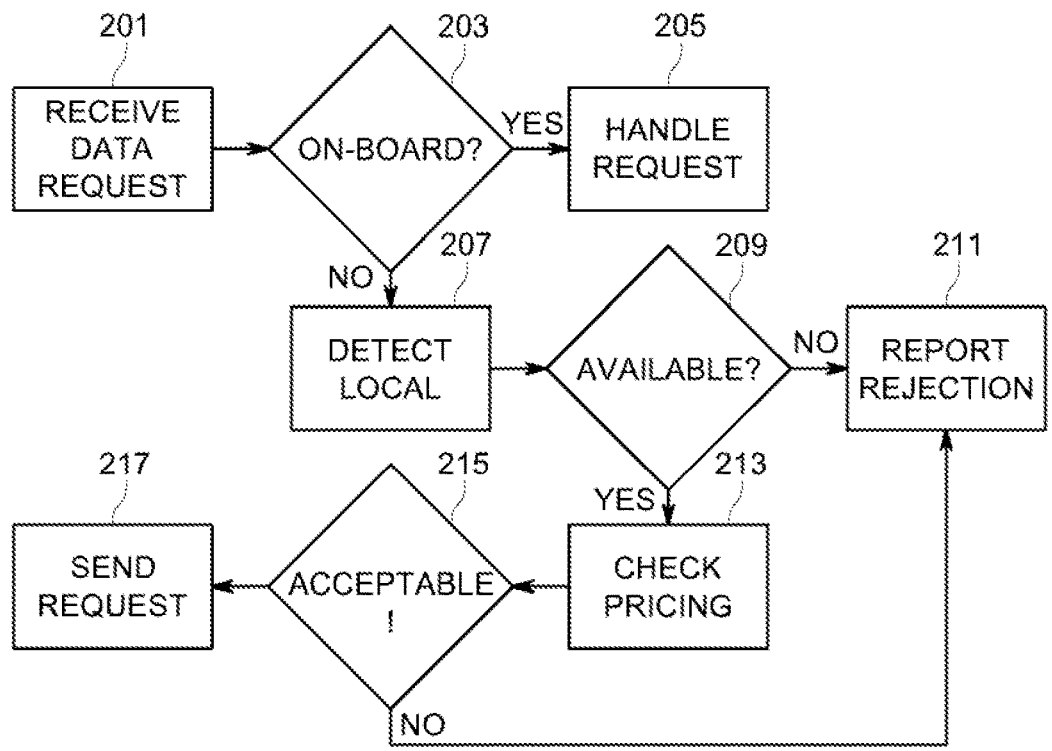
FIG. 2 shows an illustrative data sharing request process.

FIG. 2 shows an illustrative data sharing request process executable by, for example, the processor 101 of vehicle 100. In this example, at 201 the vehicle 100 receives a data request. The data request can come from an onboard controller area network (CAN) bus, a connected device connected to the vehicle locally, or another application or vehicle 100 software component (e.g., traffic, navigation, weather, etc.). The vehicle 100 determines at 203 if the request can and/or should be serviced via onboard services.

In some examples, as previously noted, the vehicle 100 may determine that the request should not be serviced via onboard services because of data restrictions, roaming, etc. In other examples, the vehicle 100 may include an onboard modem (e.g., such as the TCU 121 of vehicle 110, if so equipped), but the driver may lack a subscription to use communications services via the onboard modem. In such an instance, the onboard modem may be available for use, but at an abnormal cost. These are a few examples of why a vehicle 100 including a telematics component may elect not to service a request directly using onboard equipment.

Also, as noted, the vehicle 100 may simply lack remote communication services (e.g. lack a telematics unit) or have a malfunctioning telematics unit. At 205, the vehicle 100 handles any appropriate and serviceable request, but if the vehicle 100 cannot or should not (rule-based decision) handle the request, the vehicle 100 may search at 207 for local vehicles 110 having communication capability and that are accessible to service the data request.

Owners who are willing to service requests may instruct vehicles 110 to accept connection requests (query format) or may have vehicles 110 broadcast availability (notification format). Thus, the searching vehicle 100 may query local vehicles 110, broadcast a request, or detect a broadcast availability broadcast by vehicle 110.

If there are no local vehicles 110 that can assist in handling the data request requested at 201, the vehicle 100 may, at 209, inform the driver of the requesting vehicle 100 that the data request cannot be serviced at this time. This may provide an option to queue the data request or, in some examples, where pricing is a reason why the data request was not serviced, the driver of the requesting vehicle 100 may be provided with an option to pay a higher price in order to have the request serviced by an immediately available vehicle 110 that is charging a price that is higher than an automatically accepted price (that would otherwise be automatically accepted by process 105).

If there is an available vehicle 110 to service the request, the vehicle 100 may check pricing at 213 for the request. Pricing may be dictated in a variety of formats. The owner allowing the request to be serviced can dictate a price per use (with a use cap), a price per megabyte (or other unit of data), a price per request of a certain type (having an expected maximum data volume), etc.

In some instances, the owner/driver of the requesting vehicle 100 may offer a price for a service fulfillment, and in other examples the owner of the servicing vehicle 110 may offer a price for fulfillment. These prices can be preconfigured when the vehicles 100, 110 are not traveling, or they can be offered in an as-needed manner. In still further examples, the vehicle 100 may recommend or mandate a price for a particular service.

In this example, the vehicle 100 determines if a price for the data requested is acceptable at 215. This may require instantaneous verification from a vehicle occupant of the requesting vehicle 100, or the determination may be made automatically based on preconfigured automatic acceptance parameters and handled by process 105. If the price is acceptable, the vehicle 100 may send, at 217, the request for fulfillment. This sending may include, for example, a vehicle identification identifying vehicle 100, for billing purposes. In some instances, the vehicle 100 may also require that the transaction be fully completed before the billing event can occur. In further examples, the risk of one vehicle 110 driving away may be borne by the requester, and the billing may be completed regardless of whether the transfer is completed. In cases such as this, if the vehicles 100, 110 exchange stored payment data via onboard wallet applications, the vehicle 100 may pay at the time of request. In other examples, the vehicle 100 may pay and/or transfer payment information responsive to completion of the request. Also, as noted, vehicle identifications identifying vehicles 100, 110 can be sent to the cloud 130 by vehicle 110 for cloud-processing of payment.

Figure 3:
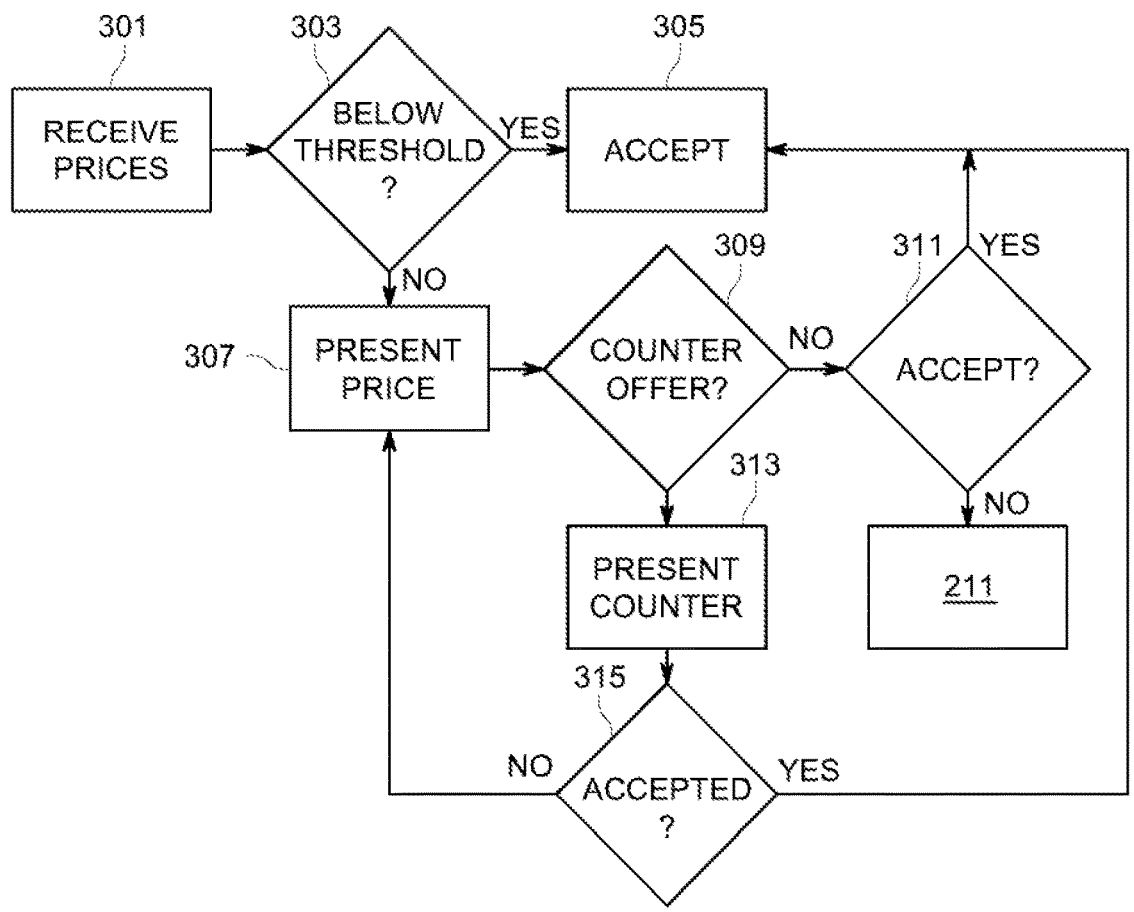
FIG. 3 shows an illustrative process for data sharing verification.

FIG. 3 shows an illustrative process for data sharing verification executable by, for example, the processor 101 of vehicle 100. In this example, the vehicle 100 may receive at 301 pricing options from one or more vehicles 110 in communication range. These received options can be broadcast prices from one or more vehicles 110 or prices sent via direct communication with vehicle 110 in response to a direct request from vehicle 100.

If the pricing for fulfilling a request is below a predefined threshold at 303, the vehicle 100 may automatically accept the pricing at 305 and send the request to vehicle 110. The threshold price(s) can be set be a vehicle 100 occupant or owner and can define pricing for certain request types or pricing per data unit. OEMs may also dictate the pricing, in certain examples.

If the price is not below the threshold, the vehicle 100 may present at 307 the price to a vehicle occupant via HMI 103. In certain examples, the price may only be presented when distraction thresholds are below predefined minimums, or, for example, if the vehicle 100 is stopped or traveling below a threshold speed. If the driver does not accept the price, the driver or another occupant may present a counteroffer at 309. It is to be understood that references to a driver also include other occupants or a vehicle owner, and presentation, selection, acceptance, configuration, etc. are not limited to being controlled by a driver.

If the option to counter-offer is available, as in this instance, the process may allow the driver to present the counteroffer at 309. For larger data transfers, for example, the driver may wish to negotiate pricing for the transfer. In other instances, the servicing vehicle 110 may simply be requesting too high of a price for a limited use service, (e.g., $2 for traffic data) and the driver may wish to negotiate a cheaper price. If the driver cannot or does not present a counteroffer, the driver still has an option to accept the pricing at 311.

If the driver presents a counteroffer at 309, the vehicle 100 can send at 313 the input counteroffer to the remote vehicle 110 intended to service the request. It is also possible for two vehicles 100, 110 to automatically negotiate based on preconfigured settings, such that a median price point is reached by processes 105, 119 without direct interaction between the two drivers. If the servicing vehicle 110 indicates acceptance of the offer at 315, the vehicle 100 can register acceptance and send the request. In an instance of automatic negotiation, predefined pricing parameters for one or both vehicles 100, 110 can define pricing for data as well as dictate automatic action based on the other vehicle accepting an offer and/or the other vehicle offering a price that is below a predefined threshold.

Figure 4:
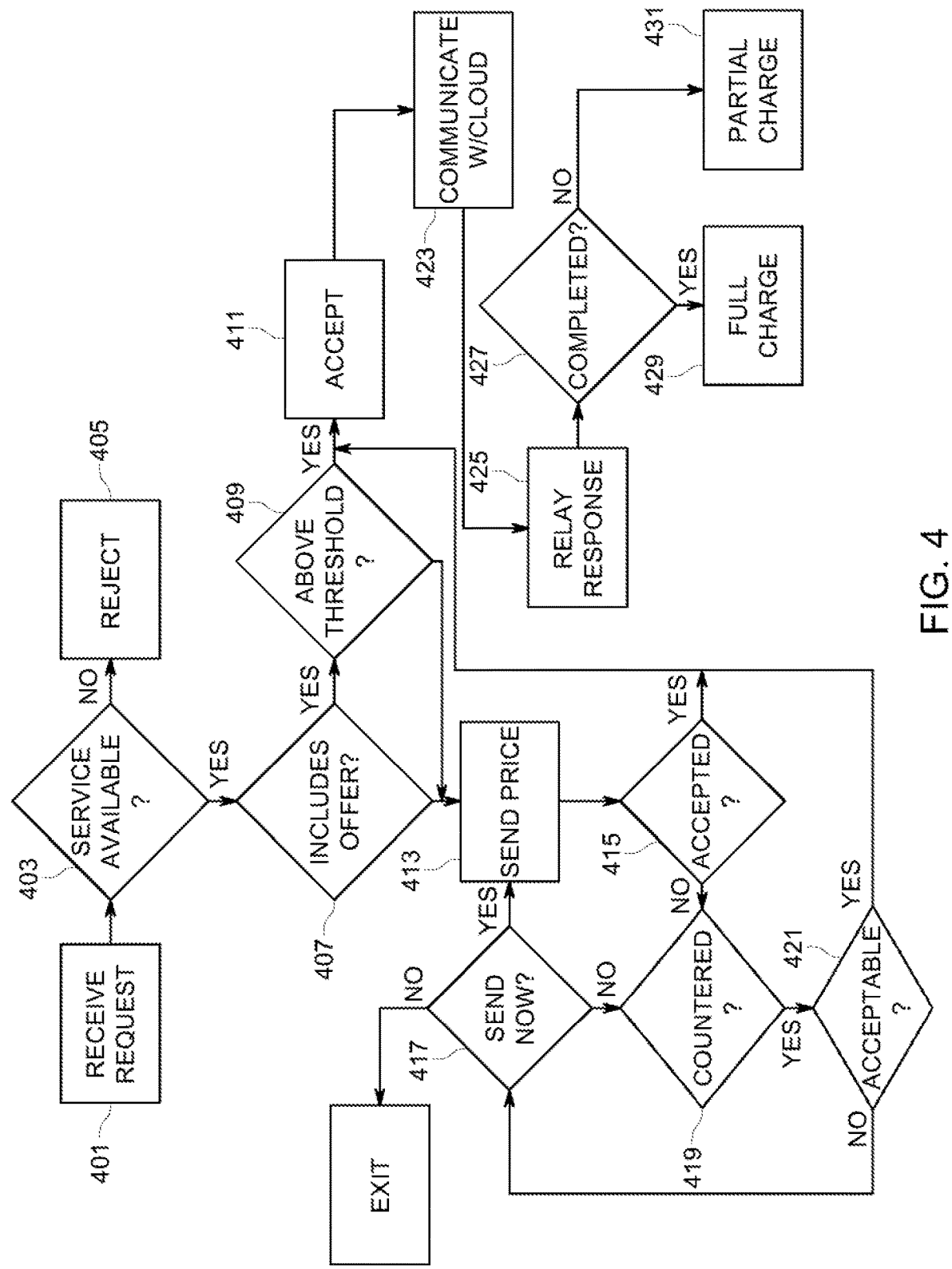
FIG. 4 shows an illustrative request handling process.

FIG. 4 shows an illustrative request handling process 119, executable by, for example, processor 111 of vehicle 110. In this illustrative example, the process 119 executes on the request servicing vehicle 110. The vehicle 110 receives the request at 401, which may be broadcast by a requesting vehicle 100 or which may be sent directly from the requesting vehicle 100.

In many cases, the servicing vehicle 110 may intermittently offer request servicing. For example, the servicing vehicle 110 may not offer servicing when the vehicle is currently using its own telematics unit 121 or, for example, when current data costs for a service provider of the servicing vehicle are above a threshold.

Accordingly, in this example, the vehicle 110 determines at 403 if the service is currently available. Also, in some instances, the servicing vehicle 110 may only be able to handle requests of a certain total volume or packet size, dictated by vehicle 110 settings or, for example whether the two vehicles 100, 110 are projected to be in proximity long enough to service the request, as determinable by headings, speeds, proximity of the vehicles, planned routes, etc. If the vehicle 110 cannot or will not service the request, the vehicle 110 may reject the request at 405.

If the vehicle 110 is available for request handling, the vehicle 110 may determine if the request includes an offered price at 407. This would be, for example, a total price for servicing or a price per data unit. If the request includes an offered price, and if the offer is above an automatic acceptance threshold at 409, the vehicle 110 may automatically accept the request at 411.

If the request does not include an offered price at 407, or if the offer is below an automatic acceptance threshold (e.g., if the price offered is too low) at 409, the vehicle 110 may respond by sending at 413 a suggested or owner-input price for servicing the request. This can include a preconfigured price, a driver specified price, or an OEM or system suggested price for servicing the request.

If the sent price is accepted by vehicle 100 at 415, the vehicle 110 may proceed to handle the request at 411. If the sent price is countered by vehicle 100 at 419, the vehicle 110 may again consider the countered price at 421. This can be via a driver interface or via an automatic negotiation process that does not interact with occupants. If the price is not accepted, but also not countered, and if the servicing vehicle 110 can still service the request, the vehicle 110 may send a new price at 417 and the negotiation process may continue.

Once the servicing vehicle 110 has indicated acceptance of the data request, the vehicle 110 may receive the request parameters to be sent to the cloud and may communicate at 423 with a cloud server to fulfil the request. This may also include transferring billing information, depending on a prearranged payment scheme. After the vehicle 110 receives the response, the vehicle 110 can relay any response at 425 or stream incoming data to the requesting vehicle 100 via an open connection.

In this example, as data is relayed, the vehicle 110 initiates a charging process, and so as communication is ongoing, but not completed at 427, the vehicle 110 charges a partial charge at 431. For example, the vehicle 110 may charge a lower rate while the transfer is ongoing and then complete the full rate charge at 429 once the transfer is completed. In other examples, the vehicle 110 may charge a pro-rata amount based on completed data and/or only charge the requesting vehicle 100 once the request is completed.

Figure 5:
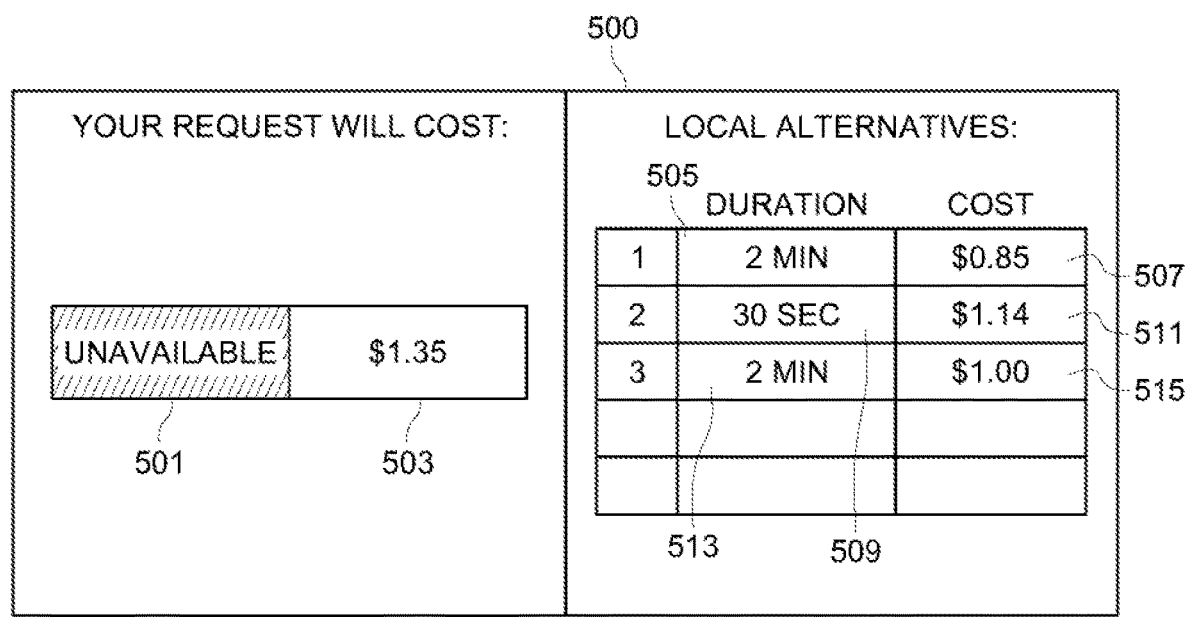
FIG. 5 shows an illustrative data-sharing display.

FIG. 5 shows an illustrative data-sharing display. In this example, a non-limiting example of a vehicle 100 HMI 103 is shown. If the vehicle 100 lacks an HMI 103, this display could be shown on, for example, a mobile device connected to the vehicle 100. This display is also not necessary, but is merely illustrative of an interactive data servicing selection process.

Here, the vehicle 100, in response to a data request, for example, may show an onboard servicing cost 503. This could be the price, for example, if the vehicle 100 were to service the request using an onboard service that is currently available. In some cases, the vehicle 100 may show that the request cannot be serviced and/or that onboard services are unavailable 501. In either instance, or at least when the onboard cost is more than a possible offboard cost, the vehicle 100 may also show some alternatives (other vehicles 110) that can service the request.

In this non-limiting example, the vehicle 100 shows three other vehicles that can service the request. Vehicle 1 is projected to take 2 minutes at a cost of $0.85, as shown by elements 505 and 507. Vehicle 2 is projected to require 30 seconds at a cost of $1.14 as shown by elements 509 and 511, and vehicle 3 is projected to also take 2 minutes, but at a cost of $1.00 as shown by elements 513 and 515. The list can be sorted by vehicle 100 in any reasonable manner (e.g., fastest, cheapest, cheapest per second, etc.). Selection of an alternative option can result in execution of the communication and request processes described herein to fulfil the pending request, or the like.

The illustrative embodiments allow for vehicle owners to provide vehicle telematics services to other vehicles in an on-demand manner and receive financial incentive for doing so. The embodiments also allow vehicles without telematics to pay incremental pricing for on-demand use of services, keeping costs low for certain vehicle without depriving them of telematics completely. In this manner, vehicles without telematics are improved via access to telematics without installation of or subscription to telematics services.

Computing devices described herein generally include computer-executable instructions where the instructions may be executable by one or more computing devices such as those listed above. Computer-executable instructions, such as those of the processes described herein, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a vehicle processor, in a first vehicle, configured to
        responsive to a vehicle process of the first vehicle requiring an element of data, determine whether an onboard system in the first vehicle is capable of providing the data at a price below a predefined cost, based on a cost associated with providing the data via a function of the onboard system different from requesting the data from a second vehicle;
        responsive to an onboard system being able to provide the data, but not being able to provide the data at a price below the predefined cost, wirelessly communicate a request for the data to the second vehicle in direct wireless communication with the first vehicle, the request including a price for the data determined according to predefined pricing parameters of the first vehicle; and
        receive the data from the second vehicle, responsive to agreement by the second vehicle to the price.

2. The system of claim 1, wherein the predefined pricing parameters include an offer price from the first vehicle for the data.

3. The system of claim 2, wherein the processor is further configured to determine the price as being the offer price, and the predefined pricing parameters dictate automatic agreement by the second vehicle to pay the offer price, if no counteroffer price is received from the second vehicle responsive to the request including the offer price.

4. The system of claim 1, wherein the predefined pricing parameters include an asking price for the data included in a response to the request from the second vehicle, the response indicating that the second vehicle will provide the requested data for the asking price.

5. The system of claim 4, wherein the predefined pricing parameters dictate that the processor automatically send the agreement responsive to the asking price being below a predefined threshold price corresponding to a type of the data and defined by the predefined pricing parameters.

6. The system of claim 5, wherein the type of data is traffic data.

7. The system of claim 5, wherein the type of data is weather data.

8. The system of claim 1, wherein the processor is further configured to:
    determine a cost for fulfilling the request using onboard capability;
    wherein the processor is configured to negotiate with the second vehicle to determine a value for the price; and
    wherein the predefined pricing parameters dictate that the processor cease negotiation with the second vehicle when the value for the price exceeds the determined cost for fulfilling the request using onboard capability.

9. A system comprising:
    a vehicle processor, in a first vehicle, configured to
        responsive to a vehicle process of the first vehicle requiring an element of data, determine whether an onboard system in the first vehicle is capable of providing the data;
        responsive to an onboard system not being able to provide the data, wirelessly communicate a request for the data to a second vehicle in direct wireless communication with the first vehicle, the request including a price for the data determined according to predefined pricing parameters of the first vehicle,
        wherein the predefined pricing parameters dictate that the processor automatically send the agreement responsive to the asking price being below a predefined threshold price corresponding to a type of the data and defined by the predefined pricing parameters, and
        wherein the type of data is navigation data, wherein the processor determines that the first vehicle is incapable of calculating a route, wherein the request include a location of the first vehicle and a destination, and wherein the request for navigation data includes a request for the second vehicle to calculate a route for the first vehicle using the location and destination; and
    receive the data from the second vehicle, responsive to agreement by the second vehicle to the price.

* * * * *